Sept. 16, 1952　　　　　V. W. WEST　　　　　2,610,722
COIN CONTROLLED FLUID DISPENSING APPARATUS
Filed Aug. 31, 1949　　　　　　　　　　　　10 Sheets-Sheet 1

INVENTOR.
VERN W. WEST
BY WHITEHEAD & VOGL
PER Albert L. Vogl
ATTORNEYS

Sept. 16, 1952 V. W. WEST 2,610,722
COIN CONTROLLED FLUID DISPENSING APPARATUS
Filed Aug. 31, 1949 10 Sheets-Sheet 2

INVENTOR.
VERN W. WEST
BY WHITEHEAD & VOGL
PER Albert L. Vogl
ATTORNEYS

Sept. 16, 1952 V. W. WEST 2,610,722
COIN CONTROLLED FLUID DISPENSING APPARATUS
Filed Aug. 31, 1949 10 Sheets-Sheet 3

INVENTOR.
VERN W. WEST
BY WHITEHEAD & VOGL
PER Albert Vogl
ATTORNEYS

Sept. 16, 1952 V. W. WEST 2,610,722
COIN CONTROLLED FLUID DISPENSING APPARATUS
Filed Aug. 31, 1949 10 Sheets—Sheet 4

INVENTOR.
VERN W. WEST
BY WHITEHEAD & VOGL
PER Albert L. Vogl
ATTORNEYS

INVENTOR.
VERN W. WEST
BY WHITEHEAD & VOGL
PER Albert L. Vogl
ATTORNEYS

Sept. 16, 1952 V. W. WEST 2,610,722
COIN CONTROLLED FLUID DISPENSING APPARATUS
iled Aug. 31, 1949 10 Sheets-Sheet 7

INVENTOR.
VERN W. WEST
BY WHITEHEAD & VOGL
PER Albert L. Vogl
ATTORNEYS

Sept. 16, 1952 V. W. WEST 2,610,722
COIN CONTROLLED FLUID DISPENSING APPARATUS
Filed Aug. 31, 1949 10 Sheets-Sheet 8
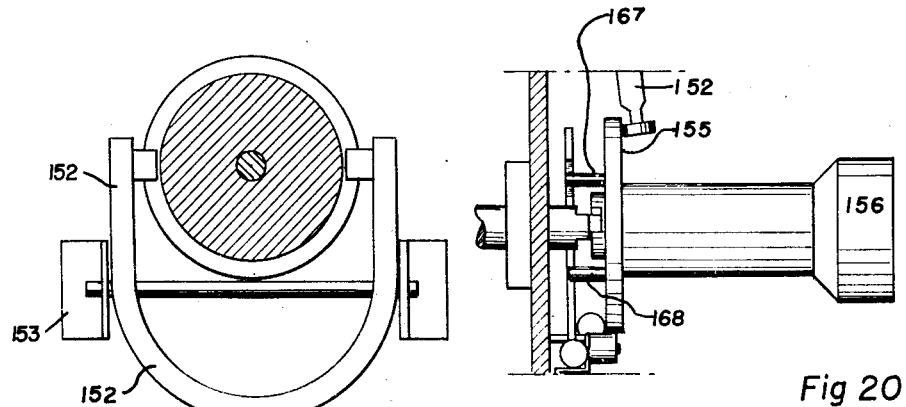
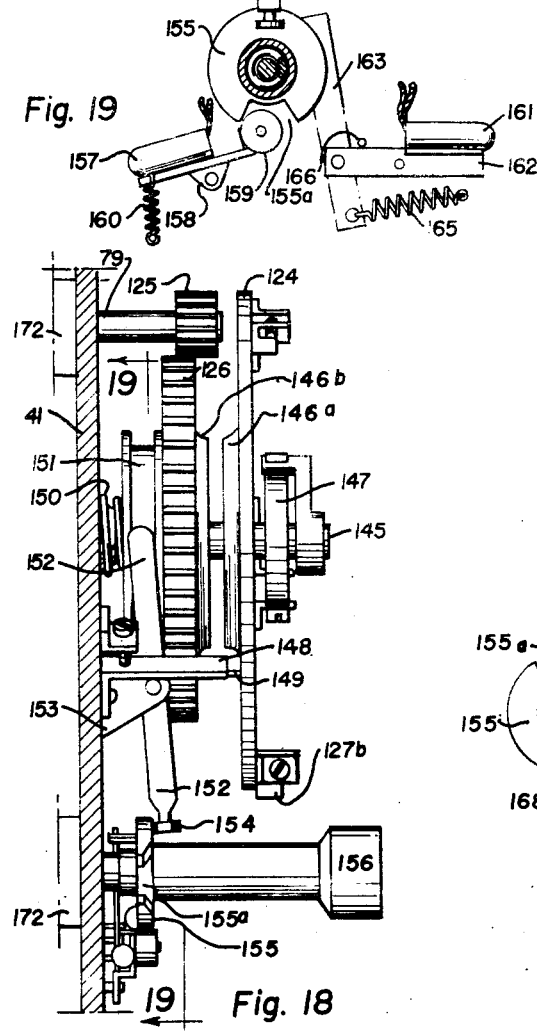
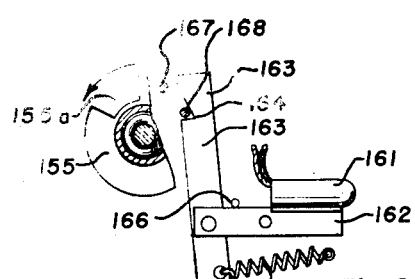
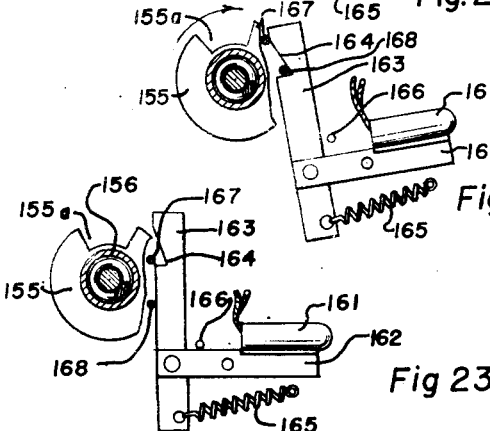
INVENTOR.
VERN W. WEST
BY WHITEHEAD & VOGL
PER Albert L. Vogl
ATTORNEYS

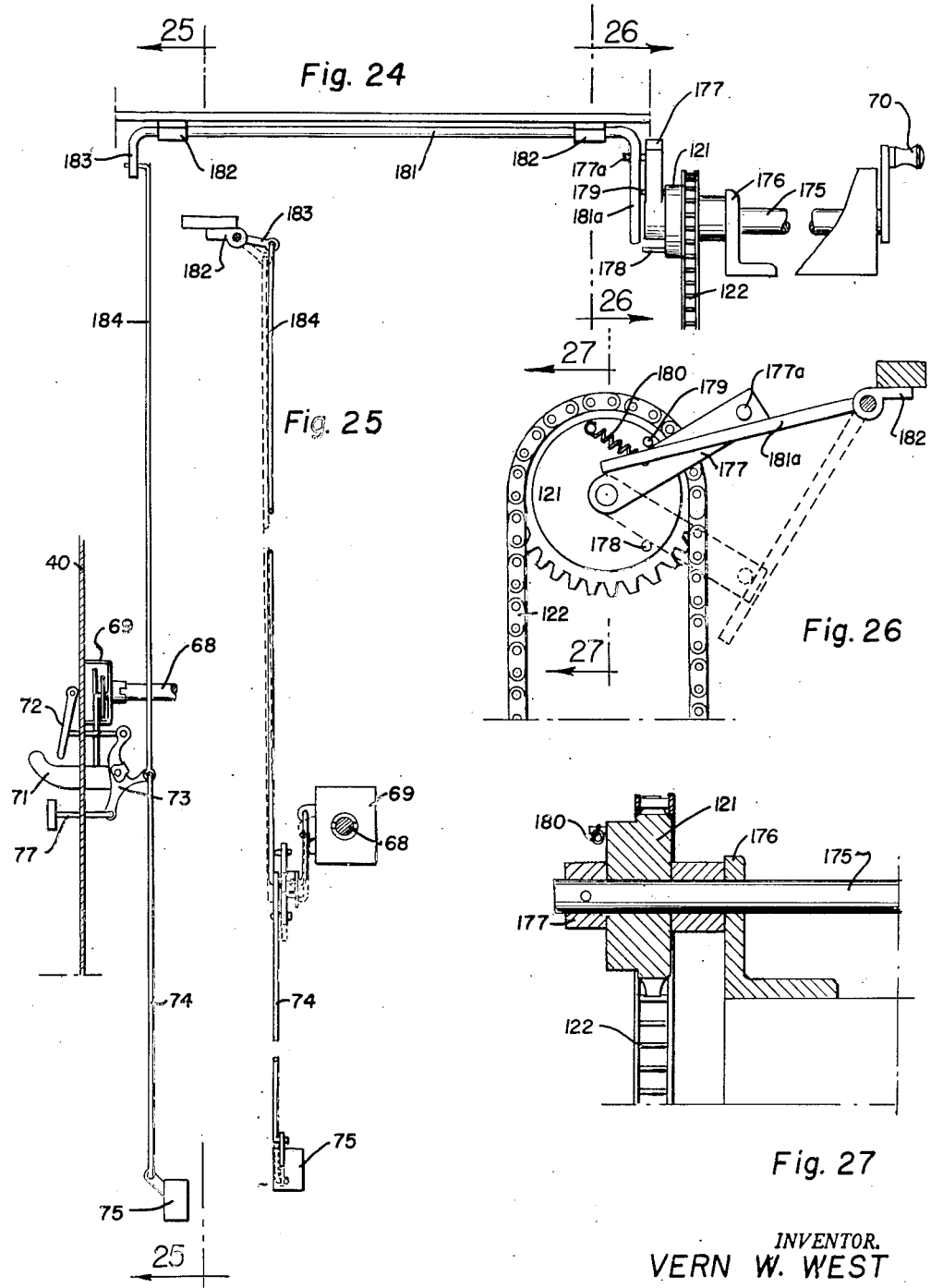

Patented Sept. 16, 1952

2,610,722

UNITED STATES PATENT OFFICE 2,610,722

COIN CONTROLLED FLUID DISPENSING APPARATUS

Vern W. West, Bennett, Colo.

Application August 31, 1949, Serial No. 113,274

7 Claims. (Cl. 194—13)

This invention relates to means and apparatus for the vending and dispensing of fluids and especially inflammable fluids and the like, and especially apparatus of the said class operable to automatically deliver a measured quantity of fluid proportioned to the value of a given standard coin employed to actuate the apparatus.

Objects of the invention are: (a) to provide improved means to automatically measure a quantity of fluid in dispensing apparatus; (b) to provide improved means automatically operable through the sole actuation of a standard coin to measure for manually-controlled delivery a quantity of fluid proportioned to the value of the coin; (c) to provide improved means in manually-controlled pump-type dispensing apparatus for delivering a given quantity of fluid through the actuation of a standard coin; (d) to provide improved means in manually-controlled computing-meter pump-type dispensing apparatus for regulation of the quantity of fluid dispensed by linkage of the computing meter with dispensing controls; (e) to provide means for linkage between a computing meter and dispensing controls for regulation of dispensing controls through actuation of the computing meter; (f) to provide improved means for coin-operation of linkage between computing meter and dispensing controls of fluid dispensing apparatus for adjustably and automatically starting and restricting the quantity of fluid delivered, that equivalent to the valve of a coin; (g) to provide improved means in such apparatus for measuring and delivering a quantity of volatile and inflammable fluid for eliminating all fire hazards; (h) to provide improved apparatus of the character described that is simple and inexpensive of construction and installation, fully automatic in operation to the point of ultimate discharge of measured fluid, which is susceptible of simple and convenient adjustment to proportion the quantity of delivered fluid to the value of a given coin, which may be fully automatic in operation or which may have the automatic feature disconnected for manual operation, and which requires a minimum of maintenance for efficient operation through long periods of use.

With these and other objects in view, all of which will more fully hereinafter appear, my invention comprises certain novel constructions, combinations and arrangements of parts, as will be hereinafter fully described and as defined in the appended claims and as illustrated in the accompanying drawings, in which:

Figure 18 is a fragmentary view of Fig. 13, showing the parts in a different operative position.

Figure 19 shows a segment of the clutch control mechanism as viewed from line 19—19 in Fig. 18 but positioned to open certain switches operable in conjunction with this mechanism.

Figure 20 shows a fragment of Fig. 13 but on a larger scale and with parts in a different operative position.

Figures 21, 22 and 23 illustrate different operative positions of a control switch as shown in Fig. 19.

Figure 24 shows linkage between the control mechanism and conventional interlock and switch controls of the fluid dispensing apparatus.

Figure 25 shows a portion of the same linkage as shown in Fig. 24, as viewed from line 25—25 of Fig. 24.

Figure 26 shows, on an enlarged scale, a segment of the linkage shown in Fig. 24, as viewed from line 26—26, Fig. 24.

Figure 27 is a sectional view of the segment of linkage shown in Fig. 26, as viewed from line 27—27 of Fig. 26.

Figure 1:
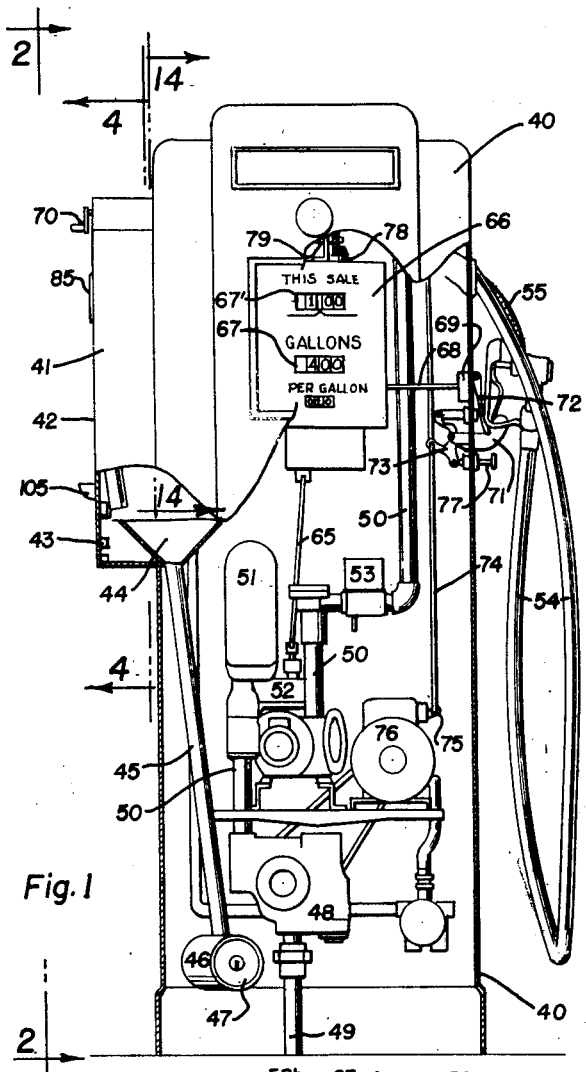
Figure 1 is a somewhat conventionalized elevation, partly in section, of an embodiment of the invention as arranged in a common type of computing fluid meter pump for practical use.

In the construction of the improvement as shown, a typical computing fluid meter pump, such as is commonly used to dispense gasoline, is modified by the addition of the coin actuating control and other mechanisms about to be described. Those conventional elements in a fluid meter pump are enclosed in a typically hollow case or frame 40 to which there is added a housing 41 for the coin actuating control mechanisms, which housing 41 is preferably integral with the case 40. This housing 41 is preferably formed in the shape of a box, having a hinged door 42 for the front panel with lock 43 to restrict access to the mechanisms therein. It is also desirable that the walls of this housing be made of rigid metal of sufficient thickness for protection against intruders. At the lower end of this housing there are provided sloping walls 44 to guide coins into chute 45 and thence into coin receiver 46. This coin receiver is provided with locking door 47 to restrict access to the contents therein. It follows that all revenue, in the form of coins, derived through sales by the automatic coin controlled fluid meter pump will pass through case 41 to be deposited in receiver 46 for eventual collection by the proprietor of the pump.

In operation of this apparatus, pump 48 draws liquid from a supply below, not shown, through intake pipe 49. From pump 48 the fluid is discharged through line 50 into air release chamber 51, thence through rotary fluid meter 52, thence through control valve 53, and finally through delivery hose 54. The actual rate of delivery is controlled by the valve operated nozzle 55 at the end of the hose. All of the elements in the fluid passage line are conventional and commonly associated with such fluid dispensing apparatus except control valve 53, which operates in conjunction with coin actuated control mechanisms in housing 41.

Figure 3:
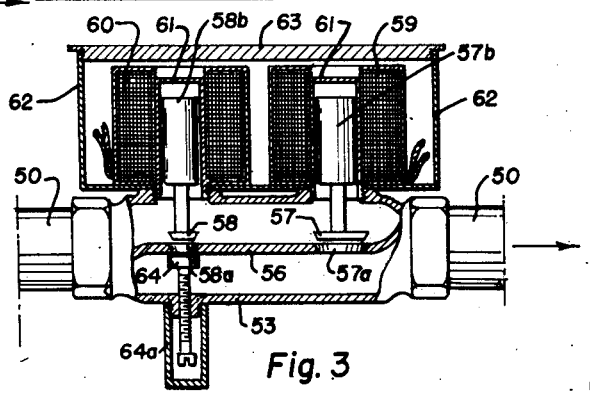
Figure 3 is a sectional view of a differential-flow solenoid control valve which is included in this structure.

The control valve 53, shown in section in Fig. 3, is a globe type valve having an elongated body and separating partition 56 to accommodate two closing needles 57 and 58 which seat in their respective orifices 57a and 58a in parttion 56. These needles are normally closed, and are opened by energizing solenoids 59 and 60 which move iron cores 57b and 58b of the needles. To prevent leakage of fluid past these cores, they are placed in cylindrical containers 61 which are screwed into valve body 53 to form tight compartments. To seal the solenoids from contact with outside vapors, a housing 62 is provided which may be closed by lid 63. This feature is a safety precaution to eliminate the possibility of fires which might otherwise be caused by an accidental burning out of a solenoid.

It is to be noted that needle 58 is smaller than needle 57 to provide a differential rate of flow through the valve. In operation of the pump both needles 57 and 58 are open and a larger amount of flow passes through 57. However, when the allotted portion of fluid is almost delivered, needle 57 will close, in a manner later explained, and the remaining portion of the fluid will pass through orifice 58a, thereby greatly reducing the rate of flow through the line. To restrict and adjust the rate of flow through orifice 58a, baffle screw 64 is provided which may be moved toward orifice 58a to reduce the effective size of that opening, the adjustment of this screw being permitted by cap 64a. By this differential action the flow through the pump will be slowed down prior to stoppage of fluid delivery and thereby over-travel of the various mechanisms and excessive delivery is prevented.

The movement of the liquid through fuel line 50 and through rotary fluid meter 52 imparts rotation to shaft 65 which operates computing head 66. The gears within this computing head, not shown, are proportioned to movements within meter 52 to properly register the dials 67 on the face of the computing head to indicate the amount of liquid delivered, and the dials 67' to indicate the monetary value thereof.

An interlock resetting shaft 68 passes through this computing head 66 and is attached to the interlock mechanism indicated generally at 69. The other end of this shaft, not shown in Fig. 1, is attached to resetting handle 70 by means of drives later described.

The elements described thus far in connection with the computing head are conventional, and conventional operation of the liquid dispensing apparatus may now be described: By placing nozzle 55 in hook 71, movement of hinge 72 releases interlock 69, thereby permitting the turning of crank 70 to set indicator dials 67 to the zero or initial position. Lifting the nozzle from hook 71 permits hinge 72 to move outward thereby permitting rocker 73 to rotate and move rod 74 upward, turning on switch 75 of motor 76 to operate pump 48. This action also locks the interlock 69 so dials 67 cannot be moved by crank 70. When a desired amount of liquid is delivered, nozzle 55 is returned to hook 71, thereby shutting off pump 48 and releasing interlock 69 to permit repetition of the cycle. This sequence of operation is essentially the same with the coin operated apparatus installed, although in that case the flow of liquid is automatically stopped by valve 53 upon the delivery of a specified amount and the resetting operation must include the deposit of a coin within the mechanisms. To avoid the necessity of replacing the nozzle 55 while resetting, a pull-push button 77 is linked to rocker arm 73.

In addition to the conventional elements in computing head 66, there is extension shaft 78, connected to shaft 65 through suitable gears not shown and which is geared to shaft 79 of the automatic coin actuated control mechanisms about to be described. Thus rotation of shaft 65 by meter 52 not only imparts movement into the computing head 66, but also movement to operate coin actuated control mechanisms.

The coin actuated control mechanism consists of two parts—the coin receiving apparatus and the moving elements linked with the computing head.

Figure 4:
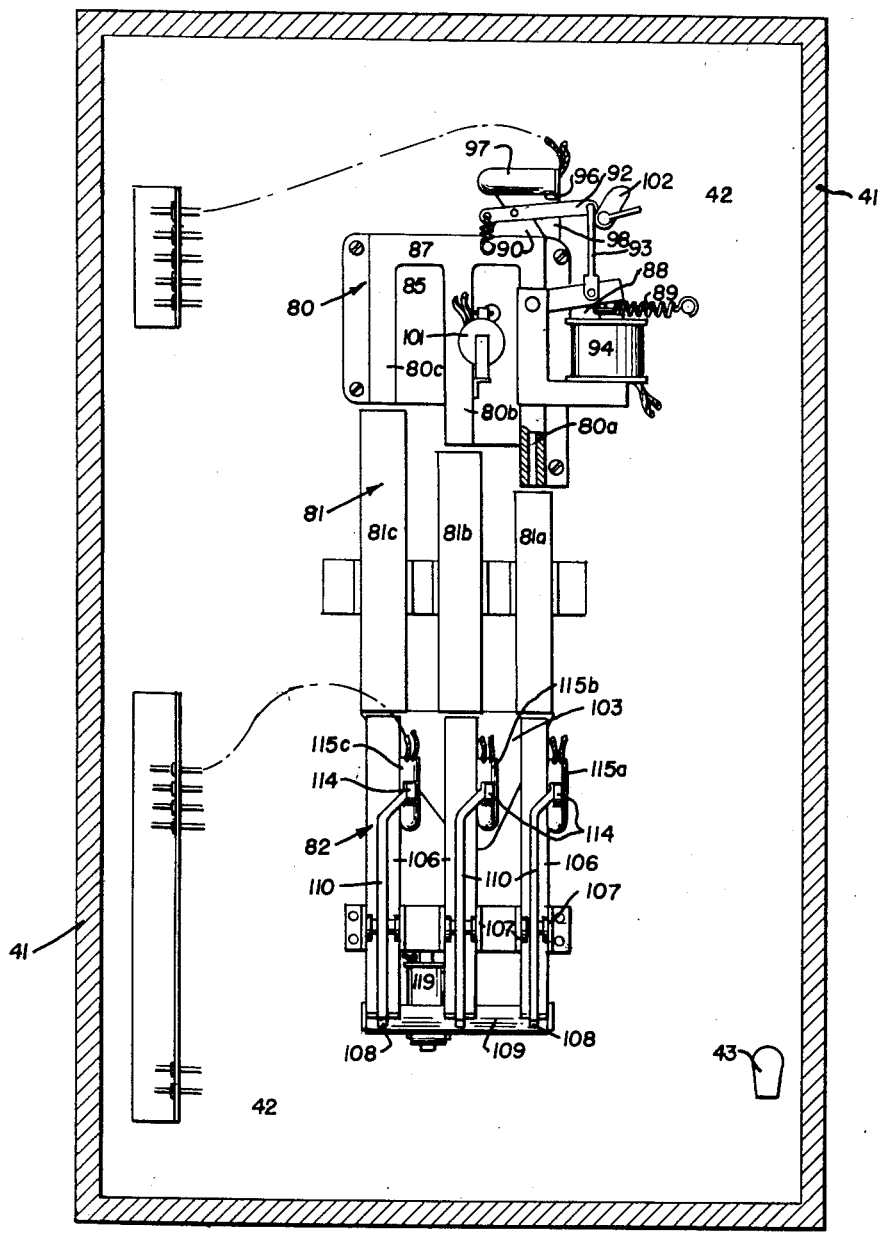
Figure 4 shows the coin receiving mechanism as viewed from line 4—4 in Fig. 1, on an enlarged scale.

In the embodiment of the invention shown, the coin receiving apparatus is placed on the hinged door 42 of housing 41, as shown in Fig. 4, and consists of three sections, the receiver frame 80, the selectors 81 and the contact mechanism 82.

Figure 2:
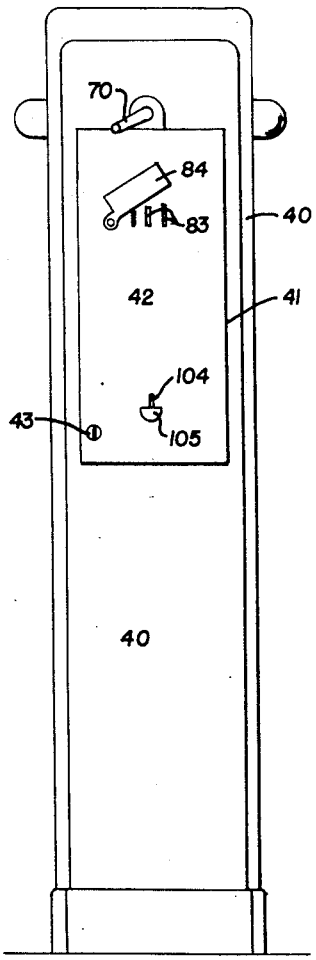
Figure 2 is an elevation of the computing fluid meter pump shown in Fig. 1 as viewed from line 2—2, Fig. 1.

To permit coins to enter the receiver frame 80, slots 83 are cut in the face of the door 42 as shown in Fig. 2. To cover and protect these slots when not in use, hinged gate 84 is provided which may be easily lifted whenever necessary. In the embodiment considered, slots are provided for three sizes of coins, preferably a quarter dollar, half dollar and dollar. The receiver frame 80, shown in detail in Figs. 5, 6, 7 and 8, is based on a flat plate 85 fastened to door 42 with screws as at 86. Three vertical ribs, 80a, 80b and 80c protruding from this plate, contain slots for the respective enumerated coins. Across the top there is a connecting ridge 87 which reinforces the construction of the unit and forms a base for other mechanisms presently described. Between door 42 and plate 85 there is interposed a slot closing slide 88 which is provided with three slots adapted to coincide with slots 84. When closed, to exclude coins, this slide 88 assumes the position shown in Fig. 7. However, the slide is normally held in the open position 88' by spring 89.

Figure 5:
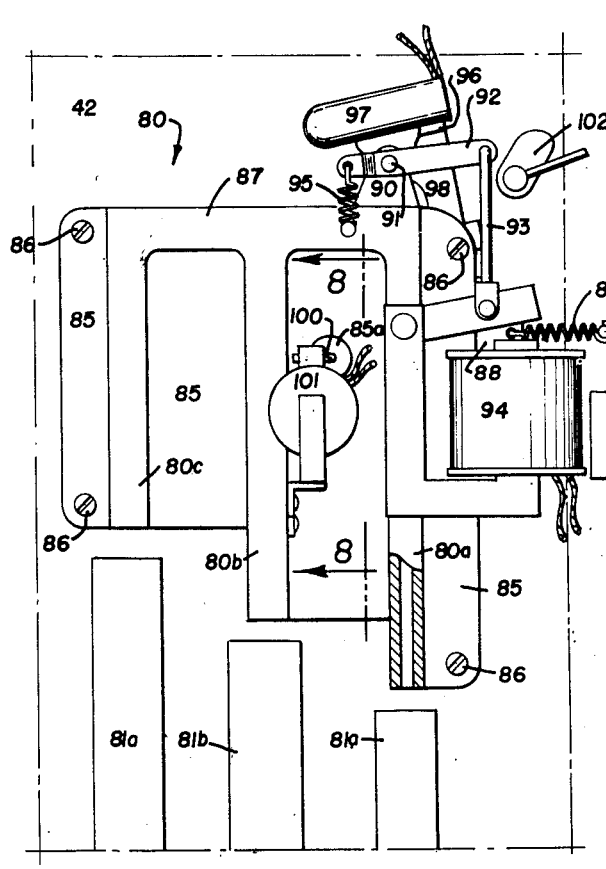
Figure 5 shows an elevation of the coin receiver base.
Figure 6:
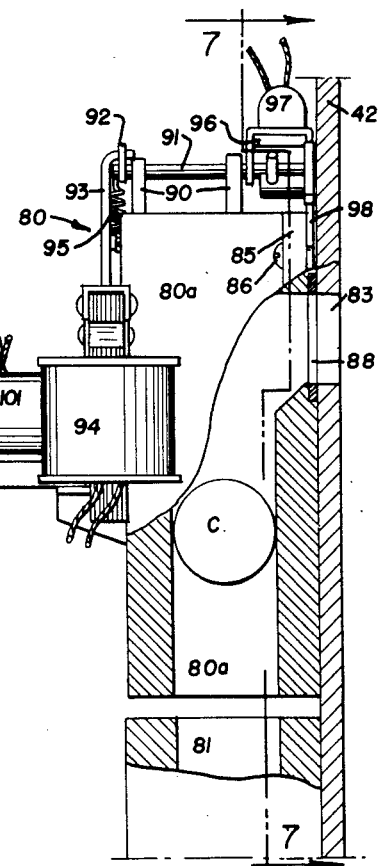
Figure 6 shows an end elevation of the coin receiver base, partly in section to show the passageway of the coin.
Figure 7:
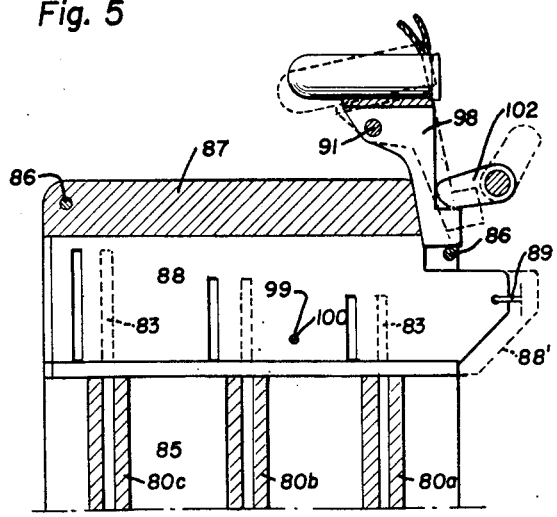
Figure 7 shows a segment of the coin receiver base in section as viewed from line 7—7 in Fig. 6.
Figure 8:
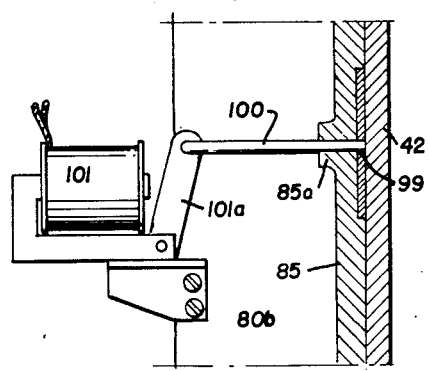
Figure 8 shows a segment of the coin receiver base in section as viewed from line 8—8 in Fig. 5.
Figure 9:
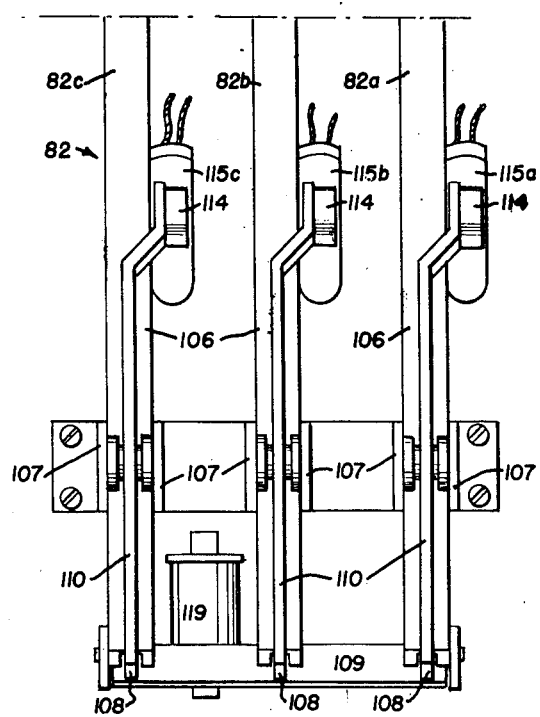
Figure 9 is an enlarged fragment of Fig. 4 showing in elevation the coin actuated control mechanism.
Figure 10:
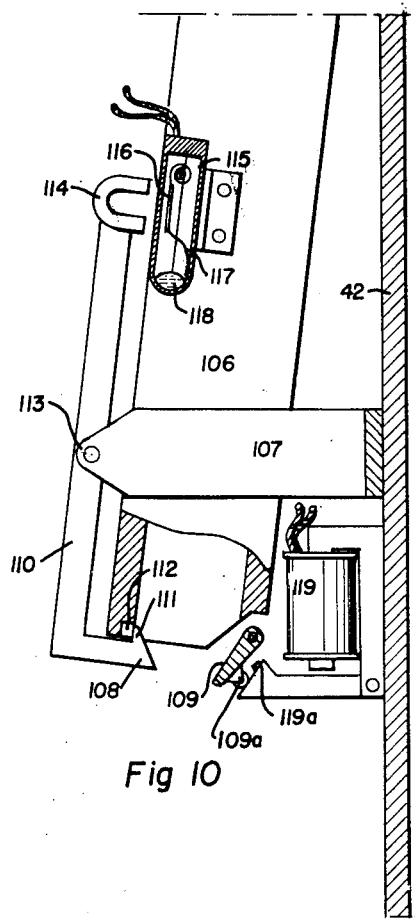
Figure 10 shows an end elevation, partly in section, of the coin actuated control mechanism shown at Fig. 9.

On ridge 87 there are ears 90 which serve as bearings for shaft 91. To one end of this shaft there is attached rocker arm 92, linked by 93 to the armature of relay 94. A spring 95 is provided to hold the mechanism in a normally open position. At the other end of this shaft there is provided base 96 upon which there is mounted a tilt switch 97. One leg of this base is elongated to form finger 98 which extends downward to contact and move slide 88. When slide 88 is in the open position the armature of relay 94 is also open, as shown in Fig. 5. This permits the placing of a coin in the mechanism whereby solenoid 94 is energized by means later described, and the downward movement of the armature of solenoid 94 rotates shaft 91 causing finger 98 to push slide 88 closed. It is to be noted that when shaft 91 rotates, the inclination of switch 97 changes and thereby closes the circuit to motor 76 as will be later described.

In slide 88 there is provided a hole 99 which is aligned with a shaft 100 whenever slide 88 is closed by finger 98. This shaft 100 is slidable in a boss 85a in plate 85 normal to slide 88. The shaft 100 is connected with the armature 101a of relay 101, with suitable play in the connections to prevent the arcuate motion of armature 101a from causing the shaft 100 to bind in the boss 85a. This armature is spring loaded, in a manner not shown, to open and push shaft 100 into hole 99 whenever properly aligned. Thus the coin slide is closed during the period of delivery of the liquid and remains closed until an electrical impulse energizes relay 101 to release slide 88 to permit to return to the open position.

To operate the liquid dispensing apparatus manually, provision is made to disconnect the automatic mechanism and to close those circuits required for manual operation only. One step of such changeover is accomplished by turning lock 102 to the position shown in Fig. 7. The lock 102 consists of a cam, rotatable to provide wedging action against finger 98, thereby rotating said finger to hold slide 88 closed and switch 97 tilted to circuit-closed position.

Conventional coin selectors are provided to separate true from spurious coins. These are mounted on the door 42 between the receiver frame 80 and the contact mechanism 82. Three such units are shown, 81a, 81b and 81c, for the respective coins. While true coins pass to the contact mechanism, spurious coins are dropped into chute 103 and pass to the outside through slot 104 in door 42. Receiver cup 105 is provided to facilitate a courteous return of such spurious coins.

Figure 11:
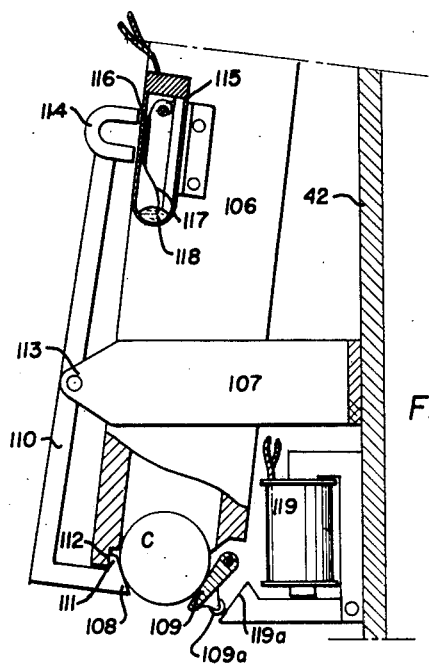
Figure 11 is similar to Fig. 10 but showing a coin in the position assumed in operation of the unit and the parts in resultant position.

The contact mechanism 82, shown in detail in Figs. 9, 10, 11 and 12, contains those elements wherewith electrical switches of various circuits are closed by a coin C to actuate the liquid dispensing apparatus. This mechanism consists of a plurality of units, 82a, 82b and 82c, to accommodate a quarter dollar, a half dollar and a dollar respectively. Each unit is aligned below a corresponding slot in the selectors to properly receive the coins. Passing from a selector 81, the coin enters a chute 106 where it falls a short distance, thereby gaining momentum. This chute is mounted on standards 107 and may be sloping somewhat to permit clearance of other mechanisms. At the bottom of the chute there is a detent 108 and gate 109 which halt the fall of the coin; however, the momentum of the coin causes the detent 108 to be offset, thereby rotating rocker arm 110 to which it is attached, as shown in Fig. 11. The movement of the detent 108 is restricted by lug 111 moving in notch 112. The rocker arm 110 is preferably swivel mounted, as on ears 113, and is provided with a magnet 114 at its distal end. As the rocker arm rotates by the coin responsive movement of detent 108, magnet 114 approaches magnetically operable switch 115, preferably of a mercury type as illustrated, and the magnetically attractive element 116 of said switch moves toward magnet 114 thereby plunging finger 117 into a bubble of mercury 118 to close the circuit. Excessive movement of the magnet 114 toward the switch 115 is prevented by engagement of lug 111 with the wall of notch 112. The above described elements 106 to 118 are identical in all of the three structures for the three different coins. The switches are designated by different letters, for convenience in describing the three circuits, namely, 115a, 115b and 115c.

Figure 12:
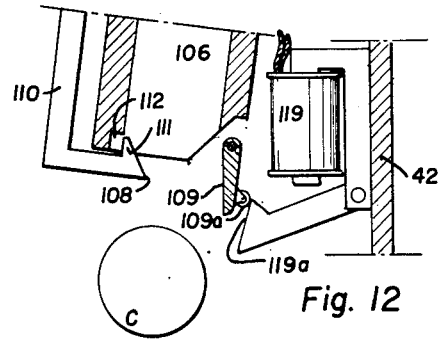
Figure 12 is a fragmentary view of Fig. 11 showing the coin release mechanism after release of the coin.

Gate 109 is held closed by an extension of the armature of relay 119, the said extension having a sloping surface 119a slidable against roller 109a of gate 109. This relay is so positioned that gate 109 is open whenever the said relay is not energized as illustrated at Fig. 12. Therefore, the relay 119 is always in an energized state whenever the coin-actuated mechanism is in operation, being de-energized to open gate 109 to release coin C. When the coin is released the detent 108 returns to its normal position and magnet 114 is retracted from its switch, thereby opening the circuit. This retractile movement of rocker arm 110 may be accomplished either through the action of gravity or by a spring-loaded means not shown.

Figure 13:
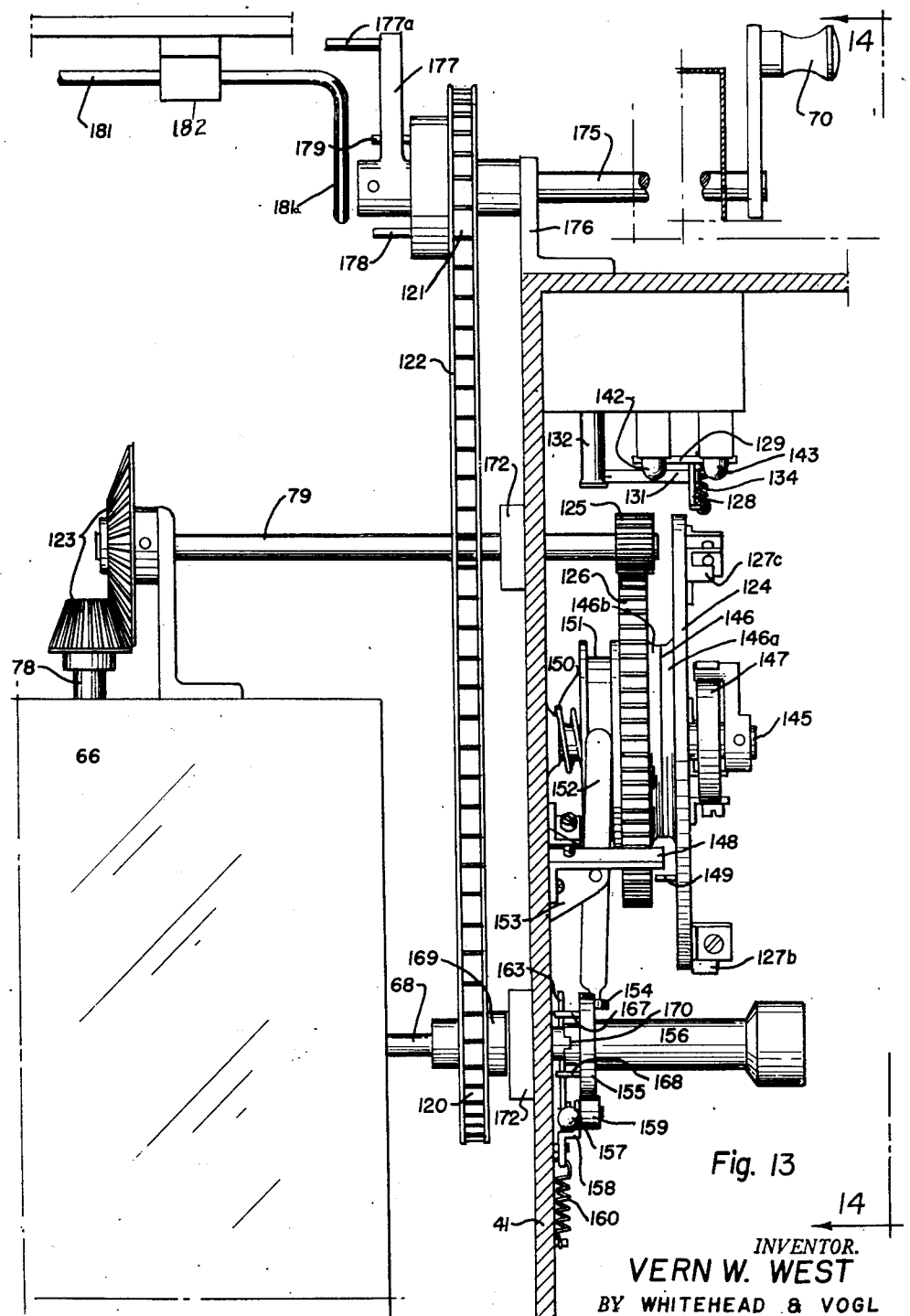
Figure 13 is an elevation of the fluid dispensing control mechanism as viewed from line 13—13 in Fig. 14.

The moving elements of the coin-actuated mechanism are connected with interlock resetting shaft 68 and shaft 79 as heretofore mentioned. The interlock resetting shaft 68 is connected to handle 70 by means of gears 120 and 121, chain 122 and shaft 175, later described, all as shown in Fig. 13, and the turning of crank 70 not only resets the interlock mechanism by turning shaft 68, but also resets other control mechanisms as later described. The rotation of shaft 79, accomplished by connection to shaft 78 with suitable bevel gears 123, operates the controls which indicate the amount of fluid delivered through meter 52. This shaft extends into housing 41 and is connected with rotating control disc 124 through spur gears 125 and 126.

The ratios of gears 125 and 126 are such as to restrict rotation of control head 124 to less than one revolution for the maximum amount of liquid delivered by operation of a single coin.

Figure 14:
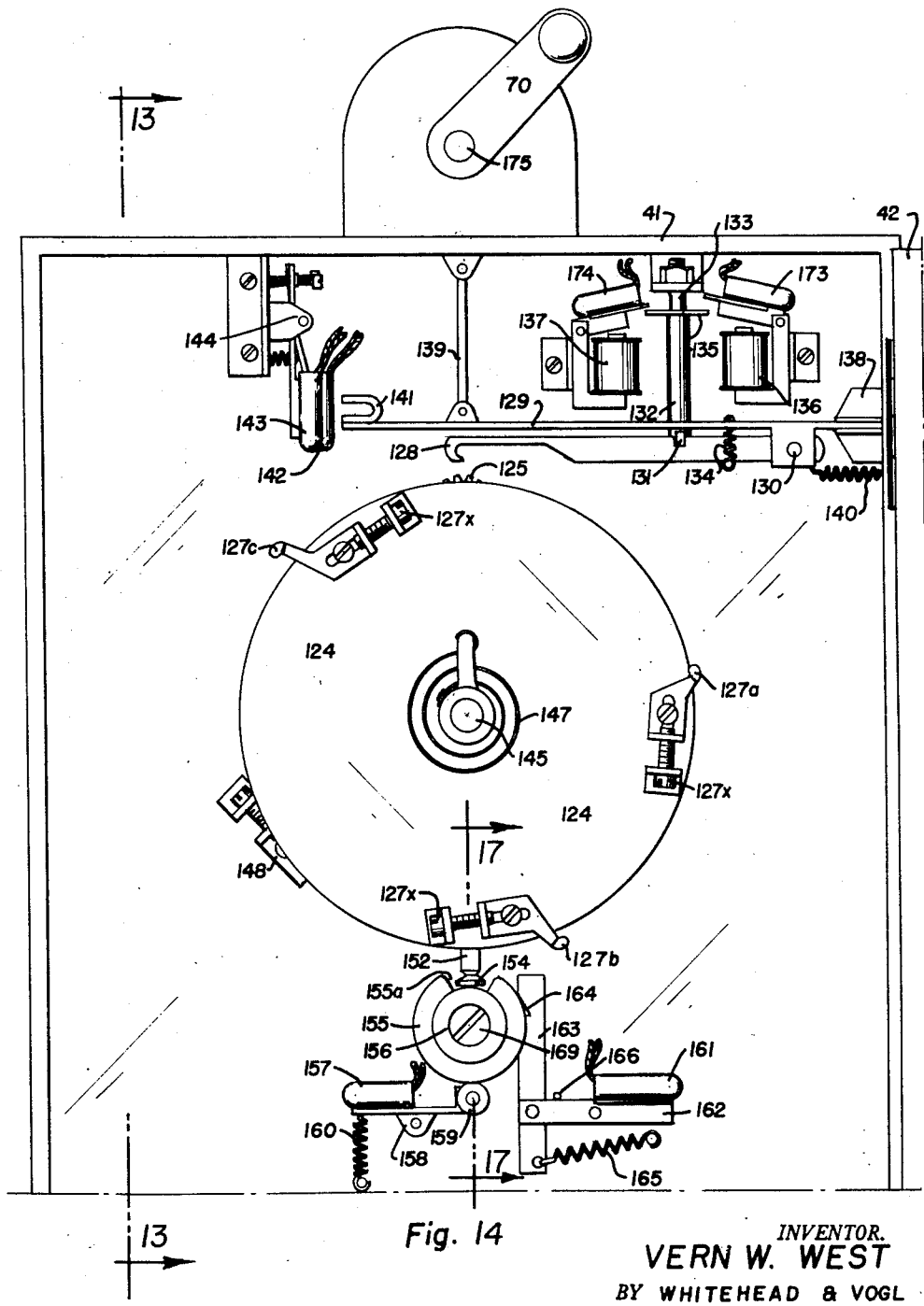
Figure 14 is an elevation of the liquid dispensing control mechanism as viewed from line 14—14 in Fig. 1.
Figure 15:
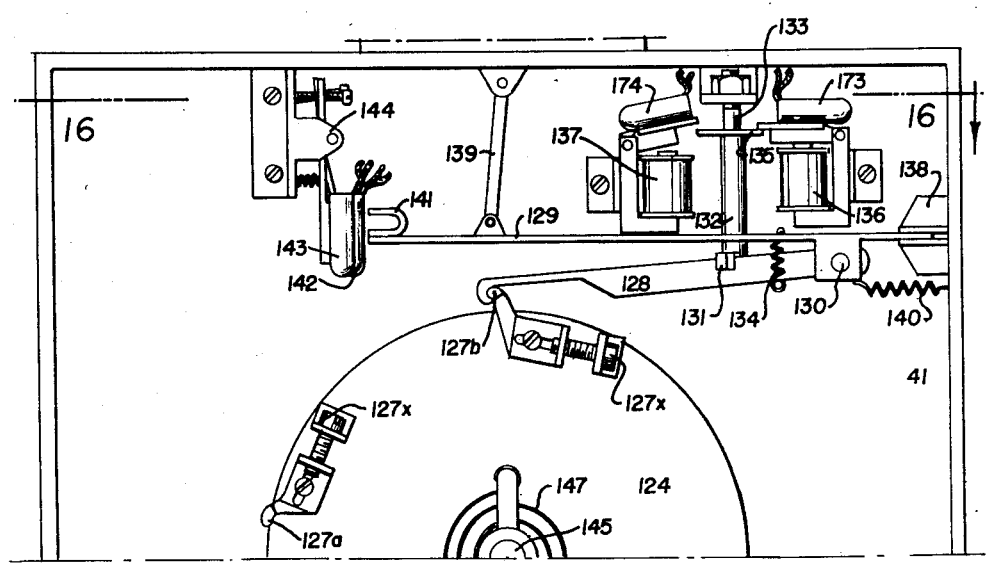
Figure 15 is a fragmentary view of Fig. 13 showing the parts at a different stage of operation.
Figure 16:
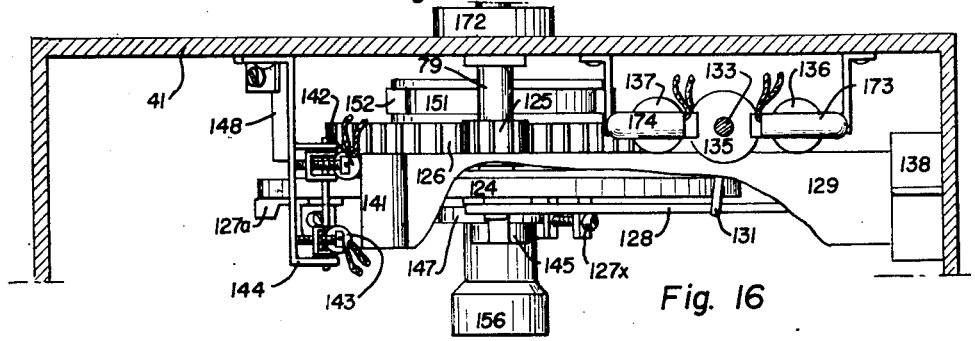
Figure 16 is a plan view of the mechanism shown in Figs. 13, 14 and 15, the frame being shown in section.

On control head 124 there are placed stops, 127a, 127b and 127c, adapted to engage hook 128 as shown in Figs. 14 and 15. The stops 127a, 127b and 127c, positioned on the control head 124 during delivery of fluid, move in counter-clockwise direction in the embodiment shown. Stop 127a is so positioned that it will move into engagement with hook 128 when the quarter dollar's worth of fluid has been delivered. Stop 127b is positioned to engage hook 128 when a half dollar's worth of fluid has been delivered, and stop 127c is positioned to engage hook 128 when a dollar's worth of fluid has been delivered. Stops 127a, 127b and 127c move along arcs of different radii with respect to the center of control head 124 in such a manner that stops 127a and 127b will pass below hook 128, when it is in its normal retracted position, while stop 127c, moving along an arc of the largest radius, will make contact with the hook 128. This hook is pivotally mounted on sliding base 129 by pin 130 and may be lowered by finger 131 to contact either stop 127a or 127b. This finger is attached to a sleeve 132 which is slidable and rotatable on shaft 133 to provide longitudinal movement and rotation of finger 131, thus permitting it to follow all movements of hook 128. A spring 134 is provided to hold the hook 128 in the normal retracted position. To lower this hook, a disc 135 is attached to the upper end of sleeve 132, responsive to contact by extensions of the armatures of relays 136 and 137. These relays are positioned at different elevations to cause different degrees of movement of hook 128. Thus, when relay 136 is energized, hook 128 is lowered sufficiently to engage stop 127b but still to permit clearance of stop 127a. The relays 136 and 137 are in circuit with switches 115b and 115a respectively and when relay 137 is energized, hook 128 will be lowered sufficiently to engage stop 127a.

Whenever a stop contacts hook 128, the rotation of the control head 124 tends to pull the hook in a horizontal direction and therewith base 129 to the left as viewed in Figs. 14 and 15. To provide means for such movements, the base 129 is slidably mounted in bracket 138 at one end, and supported by link 139 near the other end. Spring 140 is also provided to retract the base after the hook 128 is released from a stop 127.

At the extremity of the base 129 there is mounted magnet 141 which moves toward magnetically operated normally closed sequence switches 142 and 143 responsive to engagement of a stop with hook 128. These switches are pivotally mounted on a clip 144 and the mount is provided with set screws for adjustment and springs to provide tension and to permit movement whenever the switches 142 and 143 are contacted by the moving magnet 141. The switches are sequence adjusted to permit switch 142 to be contacted by magnet 141 first, and thereby open ahead of switch 143. These switches are connected with solenoids 59 and 60 of control valve 53 (Fig. 3) previously described, switch 142 being in circuit with solenoid 59 and switch 143 being in circuit with solenoid 60. Therefore, as a stop 127 contacts hook 128, rotation of the control disc 124 moves magnet 141 toward the switches 142 and 143. Switch 142 is opened first, and this action de-energizes solenoid 59, thereby closing orifice 57a. This reduces the rate of flow of the liquid through the meter 52 and all mechanisms, including control disc 124, are slowed down. Further movement of the magnet 141 causes switch 143 to open, de-energizing solenoid 60, thereby closing orifice 58a, stopping all mechanisms actuated by the meter 52. Since stops 127a, 127b and 127c are positioned on head 124 to permit metering of definite quantities of liquid, proportional to the value of a given coin, they must be set on the head 124 with precision. Adjusting screws 127x are provided for this purpose.

The control head 124 and the gear 126 are mounted on shaft 145 and are freely rotatable thereon, shaft 145 being rigidly fixed to the inside wall of housing 41. The control head 124 is connected with gear 126 through clutch 146 whenever liquid is being dispensed in the manner explained above; however, this clutch disengages to permit the control head 124 to rotate freely and to return to its original position during resetting operations. To facilitate this return to the original position, the control head 124 is connected with the shaft 145 by an involute spring 147 which is adjusted to cause a clockwise movement of the control head. An adjustable stop 148 is provided to contact a pin 149 mounted on the underside of the control head 124 to establish the proper initial position of the control head.

The clutch 146 consists of two frictionally connective faces 146a and 146b, placed on hubs on the control head 124 and gear 126 respectively, and clutching action is obtained by sliding movement of the gear 126 along shaft 145. The clutch is normally held in engagement by spring 150. To disengage the clutch, there is provided a grooved hub 151 on the gear 126 in which fingers of yoke 152 are positioned. This yoke is pivotally mounted to a base formed by ears 153, whereby movement of roller 154, at the terminal end of the yoke 152, upon disc 155 of the interlock resetting head 156, will cause disengagement of the clutch as shown in Fig. 18. For engagement of the clutch, the disc 155 is provided with an opening 155a, in which roller 154 reclines when the interlock resetting head is in the normal position for automatic coin-actuated operation of the mechanism. When the interlock resetting head is being rotated as by turning crank 70 the roller 154 moves upon the disc 155 and the clutch is disengaged and during such interval the control head may return to its normal position. It follows that when the flow of liquid is stopped by the closing of valve 53, through action of magnet 141 against switches 142 and 143, further operation of the coin-actuated mechanism will be impossible until there is rotation of crank 70 which disengages clutch 146 and permits control head 124 to return to its initial position.

In addition to the actions above described, the interlock resetting head is used for other purposes in the setting and adjusting of the coin-actuated apparatus, since it must be rotated after the delivery of a predetermined amount of liquid.

The slide release switch 157 is mounted on rocker base 158. This base is provided with a roller 159 which contacts the periphery of disc 155, and is held tightly thereagainst by a spring 160. As the resetting head 156 rotates, the roller 159 drops into opening 155a, thereby permitting spring 160 to tilt the switch 157, as shown at Fig. 19. This closes the circuit and energizes relay 101, thereby opening the coin slide 88 in a manner heretofore explained.

Another switch 161 is mounted on a pivot base 162. This base is provided with rocker arm 163 containing a notch 164 as shown in Figs. 21, 22 and 23. This rocker arm is pivotally mounted to base 162, and is adapted, by connection with spring 165, to press against interlock resetting head 156. The spring 165 is so positioned that rocker arm 163 and base 162 are also pushed upwards against pin 166 mounted on the rear wall of the housing 41. To operate this switch 161 by movement of pivot base 162, two extension pins 167 and 168 are mounted on the underside of the disc 155 as shown in Fig. 20. Rotation of the resetting head in the usual counterclockwise direction, as viewed in Fig. 21, permits extension pin 167 to pass rocker arm 163 and extension pin 168 to fall into the notch 164 as shown in Fig. 21. This movement occurs at the end of the resetting stroke as accomplished by turning handle 70. However, this resetting stroke is adjusted to obtain a backlash of about one fourth revolution with rotation of the resetting head in a clockwise direction as indicated in Fig. 22. During this clockwise movement pin 168 depresses the rocker arm 163, tilting base 162 and switch 161. As the backlash movement continues, pin 167 contacts the upper portion of rocker arm 163, thereby pushing pin 168 out of notch 164 to permit the rocker arm and base to return to the normal position as shown in Fig. 23. This switch 161 is normally closed, and is opened when tilted as by the resetting stroke above described. It is placed in circuit in series with the sequence switch 143, and in circuit with relay 119. Thus, relay 119 is energized when both switch 143 and switch 161 are closed, and when either of these switches is opened the relay 119 is de-energized and gate 109 opens to release any coin in a chute 106. Thus, a coin may be released responsive to delivery of a measured amount of liquid or by resetting the dials of computing head 66 by turning handle 70 if desirable before the automatic release of the coin.

Figure 17:
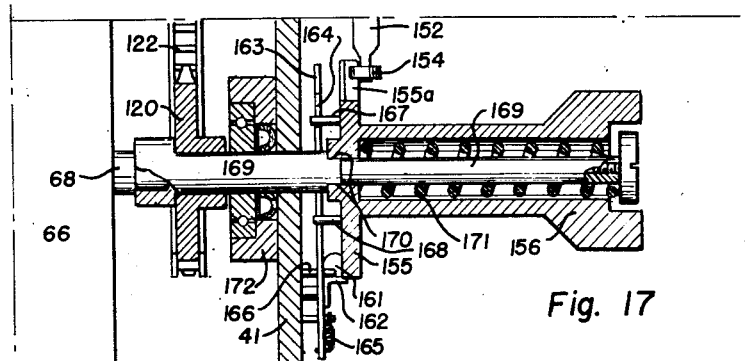
Figure 17 is a sectional view of a manually adjustable automatic clutch control mechanism as indicated at line 17—17 in Fig. 14.

The interlock resetting head 156, shown in section in Fig. 17, may be adjusted to hold the clutch 146 open if it is desirable to operate the liquid dispensing apparatus without the use of the coin controlled mechanisms. The resetting head 156 is slidably and rotatably mounted on a shaft 169 which is an extension of the interlock resetting shaft 68; however, the resetting head is normally locked to this shaft 169 by splines 170 on the shaft and matching splines 170a on the resetting head. A spring 171 is placed in a core within the resetting head 156 to compress the splines 170a against splines 170. Disengagement of the splines may be obtained by pulling the head to a position as shown in Fig. 20. There are preferably two matching splines on each member to obtain a rotation of 180 degrees, thus limiting adjustments to two positions. In the operations previously described the resetting head was positioned to permit the wheel 154 of yoke 152 to lie in the slot 155a in disc 155 whenever liquid is being dispensed. When the resetting head is rotated 180 degrees by changing the position of the splines, the wheel 154 will be upon the disc 155, and the clutch 146 will be disengaged. Then the coin controlled mechanisms cannot function because, regardless of the movement of the spur gear 126, the control head 124 will not move.

One of the objectives of this invention is to eliminate all hazards of fire that may arise from the fumes of a volatile inflammable fluid such as gasoline. Therefore, all switches described are preferably glass enclosed mercury contact switches of a type which eliminates all possibilities of sparking in the atmosphere when the switches are opening or closing. To provide further safety the housing 41, which contains most of the mechanisms above described and all of the switches except the motor switch 75, is sealed from the main case 40 of the dispensing apparatus. Where the shafts 169 and 79 pass through the wall of housing 41 there are provided sealed bearings 172 of a construction such as shown in Fig. 17.

Figure 28:
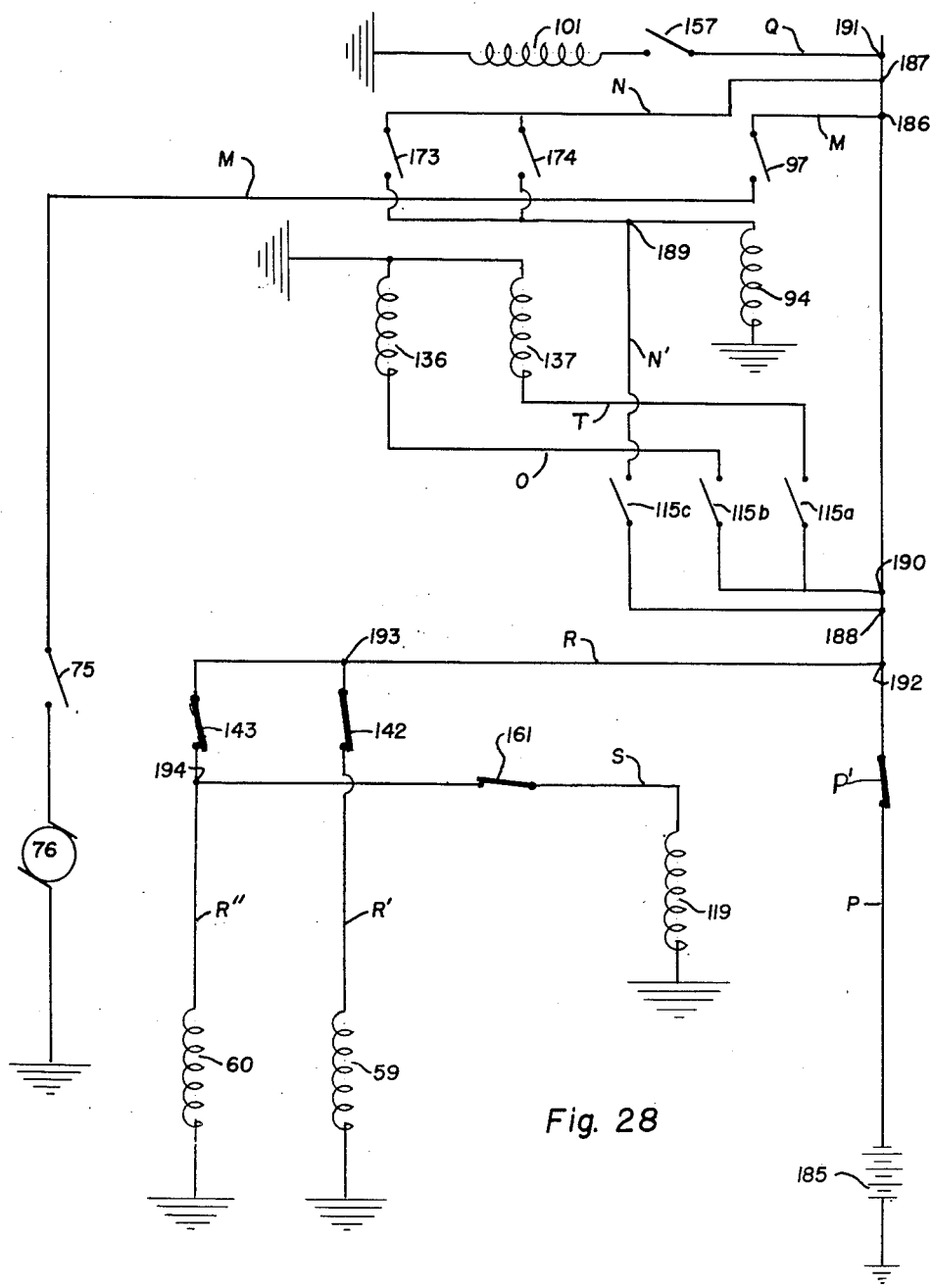
Figure 28 is a diagram of the electrical circuits used for the operation of the herein illustrated and described embodiment of the invention.

The motor 76, which operates the main pump 48, is controlled by switch 75 and also by switch 97 as previously described. Switches 75 and 97 are in series in the same circuit, and thus both switches must be closed before the motor 76 becomes operative. The switch 97, mounted upon the tilting base 96, is closed when relay 94 is energized as previously explained. Relay 94 is placed in circuit with switch 115c whereby the action of a dollar in the contact mechanism 82c will close switch 115c and energize relay 94. Relay 94 is also in circuit with a switch 173 which is placed on the armature of relay 136, closing whenever the said relay is energized. This is accomplished by closing switch 115b by the action of a half dollar in the manner as previously described. Relay 94 is further in circuit with a switch 174 which is placed on the armature of relay 137, closing whenever the said relay is energized. This is accomplished by the action of a quarter dollar in the manner as previously described. Since the relay 94 is energized by the action of either switch 115c, or switch 173, or switch 174, it follows that these switches must be connected in parallel as shown in the wiring diagram in Fig. 28. It likewise follows that the switch 97, in the circuit for the motor 76, is operated by the action of the coins; however, it should also be noted that this switch may be held closed by action of the lock 102 whenever it is desirable to disconnect the coin operated means.

The motor switch 75 is controlled by the interlock mechanism 69, being connected thereto by rod 74. This switch may be turned on when the nozzle 55 is removed from hook 71 to permit the hinge 72 to be moved outward or to permit pushing of button 77, all as previously described. Whenever the nozzle is off the hook 72, as when it is placed in a receiving receptacle as a gasoline tank, and when a metered amount of fluid is delivered by operation of the coin controlled mechanisms, it may be desirable to add another coin to the mechanism to obtain additional liquid without replacing the nozzle 55 on hook 72. For this purpose a linkage is provided between the handle 70 and the interlock mechanism 69, as shown in Fig. 24, whereby rotation of the handle 70 depresses the rocker 73 of the interlock mechanism 69 before the dials of the computing head 67 are cleared.

The handle 70 is attached to shaft 175 which is mounted on suitable bearings as at 175. The gear 121 which connects with the computing head, and other mechanisms previously described, is mounted on this shaft 175, but is freely rotatable thereon. Rotation of the said gear 121 is accomplished by crank 177, attached to shaft 175, contacting pin 178 which is attached to the gear 121. However, in the initial position of operation the crank 177 does not contact the pin 178, but is held against a pin 179 by spring 180. The pin 179 is so positioned that the handle 70 has to be turned approximately 45 degrees before crank 177 engages pin 178, and during this portion of the movement of handle 70 the gear 121 is held in position by friction of other gears within the computing head 66. During this movement of the handle 70 an extension pin 177a on crank 177 trips lever 181a of rod 181. This rod is rotatable, being mounted on suitable bearings 182. At its distal end there is provided another lever 183 pivotally engaged to connecting rod 184 which, in turn, is connected to the rocker 73. It follows that the initial movement of the handle 70 thereby rotates rod 181 to depress the rocker 73 to shut off the motor 76 before crank 177 engages pin 178 to initiate rotation of the interlock resetting shaft 68 and the clearing of the dials within the computing head 66.

To operate the apparatus above described there must be provided a source of power which might be a battery or generator, as generally indicated at 185, and from this source there is conveniently located a power lead P as shown in Fig. 23. The power lead P has a conventional manually-operated switch P' for turning on or shutting off the apparatus, switch P' being normally closed during operation. A motor circuit M is attached to this power lead as at 186, and contains switches 97 and 75, in series, and the motor 76. Motor control circuits N and N' are provided to operate the switch 97 by energizing relay 94. The circuit N is attached to the power lead P, as at terminal 187, and is provided with switches 173 and 174 connected in parallel, as previously described, and operates when a half dollar or quarter dollar is placed in the mechanism. The circuit N' is attached in the power lead, as at terminal 188, and is connected in parallel with circuit N at terminal 189. In this circuit N' there is switch 115c which closes by the action of a dollar as described.

There are also provided control circuits O and T for operation of relays 136 and 137 respectively. In circuit O there is switch 115b which responds to the action of a half dollar in the mechanism. In circuit T there is switch 115a which responds to the action of a quarter dollar. As stated, the relays 136 and 137 operate to close switches 173 and 174, and to lower hook 128 to engage stops 127a or 127b. These circuits are attached to the power lead at terminal 190, and are essentially connected in parallel as shown, but may also be connected as separate circuits.

A coin slide release circuit Q is connected to the power lead at terminal 191. This circuit contains relay 101 and switch 157 in series. The switch and relay operate in the manner as described above, and the switch is normally open, being closed only momentarily.

A control valve circuit R is connected to the power lead P at terminal 192, and is bifurcated at 193 to form separate or parallel circuits R' and R" to solenoids 59 and 60 of control valve 53. The circuit R' to solenoid 59 contains the normally closed sequence switch 142. The circuit R" to solenoid 60 contains the normally closed sequence switch 143 which opens a short time after the first switch opens, as previously explained. At terminal 194 in circuit R" there is a bifurcation point, with one lead, forming the coin release circuit S. The circuit S is operative with switch 143, and also contains the normally closed switch 161 to operate relay 119. It is to be noted that these switches are normally closed and open only during the resetting operations or whenever a predetermined quantity of liquid is metered and it is desirable to close the valve 53.

A typical cycle of operation of the apparatus may best be described by assuming an initial condition as upon a completion of a previous operation after a measured amount of fluid had been delivered and with the indicator dials 67 and 67' at some value other than zero, and with or without the nozzle 55 placed upon the hook 71. In such state, the switch P' would be closed, the coin slide 88 would be closed by the extension of shaft 100 into the hole 99 of the slide, the disc 124 would be rotated to a position such that a stop 127 would have engaged and offset the hook 128, the magnet 141 would have the sequence switches 142 and 143 opened and thereby the valve 53 would be closed so that there could be no delivery of fluid, and a coin would be lodged in the contact mechanism 82 with a switch 115 closed by the coin.

For operation, beginning with the above assumed position of parts, the first step is to turn the handle 70. The first phase of rotation of the handle acts to depress the rocker 73 to move the interlock mechanism and shut off the motor 76 by opening the switch 75. This operation is the same as would be accomplished by hanging the nozzle 55 upon the hook 71. Next, the rotation of the handle 70 initiates rotation of shaft 68 and sets the indicator dials 67 and 67' to zero. At the same time, the rotation of the shaft 68 is accompanied by rotation of disc 155, and the resulting movement, of the roller 154 from the opening 155a and onto the face of disc 155, disengages the clutch 146 which permits the control head 124 to return to its initial position. Such return removes the stop 127 from the hook 128, magnet 141 moves away from sequence switches 142 and 143 to close those switches and open valve 53 for subsequent fluid delivery.

The continuing rotation of the disc 155 moves the opening 155a to a position to tilt and momentarily close the slide release switch 157 to energize the relay 101, retract shaft 100 and permit the coin slide 88 to move to the open position for deposit of a coin. The movement of the coin slide 88 tilts the finger 98 and opens the switch 97 of the motor circuit 76.

Further continuing rotation of the disc 155 to its final returned position where clutch 146 reengages the control head 124, is accompanied by movement of pins 167 and 168 which react with rocker arm 163 to momentarily open the normally closed switch 161 and thereby deenergize relay 119 to permit the gate 109 to drop and release the coin held by the contact mechanism 82 from the preceding operation. This release acts to open the switch 115 and deenergize the circuits connected therewith.

The next step consists in the deposit of a coin, for example, a 50-cent coin, in the middle slot carried by the rib 80b. The coin, upon passing through the selector unit 81b, enters chute 106 of the contact mechanism 82 to become lodged at the bottom thereof to move rocker arm 110 and close switch 115b, the switch 161 being reenergized and gate 109 being closed to hold the coin in place. The closure of switch 115b reacts to energize relay 136 to thereby lower hook 128 to the position to engage stop 127b by subsequent rotation of the head 124. The energizing of relay 136 lowers its armature and thereby closes switch 173 thereon. This closure energizes relay 94 which tilts the finger 98, associated therewith, to push the coin slide 88 closed and close the switch 97 of the motor circuit M. The coin slide is then held closed by the shaft 100 entering the hole 99.

The next step is to remove the nozzle from the hook and to push button 77 to close switch 75 and commence delivery of fluid. As such delivery progresses, the rotation of the indicator dials 67 and 67' is accompanied by rotation of the computing head 124 and this continues until the stop 127b contacts hook 128 and moves the magnet 141 against the sequence switches 142 and 143 to open and deenergize the solenoids 59 and 60 of the control valve 53 to shut off that valve and complete the cycle.

Now I have described in detail only an embodiment of my invention, and other variations and alterations of the mechanisms involved in its operation will be apparent to those skilled in the art, and it is therefore my desire that the scope of my invention be limited only by the appended claims.

I claim:

1. In combination with a fluid dispensing apparatus having a liquid reservoir, a flow line therefrom, a pump in the flow line, a fluid meter in the flow line, a computing head operatively connected with the fluid meter, means for selectively activating and stopping the pump, means for setting the computing head to zero, and means for preventing the activation of the pump until the computing head is set to zero, scales and mechanisms in the computing head indicating the monetary value of the quantity of fluid registered by the meter, the additional elements comprising: a valve operable responsive to electrical impulses initiated at a switch, a switch and switch-operating mechanism including a hook movable to various positions, coin activated means adapted to move the hook to a position predetermined by a coin inserted in the activating means, a rotatable disc carrying stops adapted to selectively engage said hook in its various positions, switch contacting means associated with the hook and adapted to activate the switch when moved into contact therewith, said switch contacting means being adapted to contact the switch responsive to the engagement of any one of the stops with the hook, and means for rotating the disc.

2. In apparatus as defined in claim 1, a single means for setting the head to zero and for setting the disc to initial position.

3. In apparatus as defined in claim 1, the means for setting the computing head to zero being linked to the disc, and thereby adapted to set the disc in initial position coincident with setting the head to zero.

4. In apparatus as defined in claim 1, the said means for rotating the disc comprising a linkage between the disc and the said scales and mechanisms, and the said means for setting the computing head to zero being further linked to the disc and adapted to disconnect said linkage between the disc and the said scales and mechanisms upon setting the said head to zero, and further adapted to set the disc in initial position coincident with setting the head to zero.

5. In apparatus as defined in claim 1, two linkages for connecting the computing head mechanism with the disc, the first linkage being adapted to set the head indicating mechanism at zero and coincidently set the disc at initial or starting position, and thereupon to automatically disconnect itself, and the second linkage adapted to coordinate the operation of the scales and mechanisms with the rotation of the disc, and being adapted to operatively connect said mechanisms with the disc upon the disconnection of the first linkage.

6. In apparatus as defined in claim 1, two linkages for connecting the computing head mechanism with the disc, the first linkage being adapted to set the head indicating mechanism at zero and coincidently set the disc at initial or starting position, and thereupon to automatically disconnect itself, and the second linkage adapted to coordinate the operation of the scales and mechanisms with the rotation of the disc, and being adapted to operatively connect said mechanisms with the disc upon the disconnection of the first linkage, the rotation of the disc and the indicating mechanisms being operative responsive to the coin activating mechanism.

7. In apparatus as defined in claim 1, two linkages for connecting the head computing mechanism with the disc, the first linkage being adapted to set the head indicating mechanism at zero and coincidently set the disc at initial or starting position, and thereupon to automatically disconnect itself, and the second linkage adapted to coordinate the operation of the scales and mechanisms with the rotation of the disc, and being adapted to operatively connect said mechanisms with the disc upon the disconnection of the first linkage, manually operable means for selectively disconnecting and reconnecting the said linkage whereby to render the apparatus, selectively, coin activated or manually operable.

VERN W. WEST.

REFERENCES CITED

The following references are of record in the file of this patent:

UNITED STATES PATENTS

| Number | Name | Date |
|---|---|---|
| 2,223,146 | Yeomans | Nov. 26, 1940 |
| 2,384,585 | Alexander | Sept. 11, 1945 |
| 2,451,776 | Rush | Oct. 19, 1948 |